US012745048B2

(12) United States Patent
Sans et al.

(10) Patent No.: US 12,745,048 B2
(45) Date of Patent: Sep. 22, 2026

(54) MICROPHONE ASSEMBLY AND METHOD FOR PROVIDING HEARING ASSISTANCE WITH OPTIMIZED DIRECTIVITY

(71) Applicant: SONOVA AG, Stäfa (CH)

(72) Inventors: Miquel Sans, Stäfa (CH); Xavier Gigandet, Stäfa (CH)

(73) Assignee: Sonova AG, Stäfa (CH)

( * ) Notice: Subject to any disclaimer, the term of this patent is extended or adjusted under 35 U.S.C. 154(b) by 93 days.

(21) Appl. No.: 18/735,853

(22) Filed: Jun. 6, 2024

(65) Prior Publication Data

US 2024/0414484 A1 Dec. 12, 2024

(30) Foreign Application Priority Data

Jun. 9, 2023 (EP) .................................... 23178330

(51) Int. Cl.
*H04R 25/00* (2006.01)

(52) U.S. Cl.
CPC ......... *H04R 25/407* (2013.01); *H04R 25/405* (2013.01); *H04R 25/554* (2013.01)

(58) Field of Classification Search
CPC .. H04R 25/407; H04R 25/405; H04R 25/554; H04R 3/005; H04R 2430/23; H04R 2430/21; H04R 2201/40; H04R 1/1083; H04R 29/005; G10L 2021/02166; G10L 21/0208
USPC .............................. 381/92, 313, 56; 379/119
See application file for complete search history.

(56) References Cited

U.S. PATENT DOCUMENTS

| | | | |
|---|---|---|---|
| 8,391,523 B2 | 3/2013 | Biundo Lotito et al. | |
| 10,735,870 B2 | 8/2020 | Ballande et al. | |
| RE48,371 E | 12/2020 | Zhu et al. | |
| 11,509,999 B2 | 11/2022 | Rollow, IV et al. | |
| 2013/0039504 A1 | 2/2013 | Pandey et al. | |
| 2013/0272097 A1* | 10/2013 | Kim .................... | G06F 3/04883 367/129 |
| 2015/0063069 A1 | 3/2015 | Nakadai et al. | |
| 2015/0373452 A1* | 12/2015 | Kubota .................... | H04R 3/12 381/97 |
| 2021/0051397 A1 | 2/2021 | Veselinovic et al. | |

OTHER PUBLICATIONS

Extended European Search Report issued in corresponding application EP 23178330, dated Dec. 6, 2023.

* cited by examiner

*Primary Examiner* — Norman Yu
(74) *Attorney, Agent, or Firm* — McDonald Hopkins LLC

(57) ABSTRACT

A microphone assembly includes at least three microphones to capture an input audio signal; an audio signal processing unit for processing the input audio signals to generate an output audio signal with a directivity; an audio source direction estimation unit; and a control unit. The audio source direction estimation unit includes first and second direction of arrival estimation modules for estimating first and second angles of incidence between an audio source and first and second axes defined by first and second pairs of the microphones, respectively; and an elevation estimation module for estimating an angle of elevation of the audio source with regard to a microphone plane based on the estimated first angle of incidence and the estimated second angle of incidence. The control unit uses the estimated angle of elevation to control a directivity parameter of the audio signal processing unit.

13 Claims, 4 Drawing Sheets

MICROPHONE ASSEMBLY AND METHOD FOR PROVIDING HEARING ASSISTANCE WITH OPTIMIZED DIRECTIVITY

The invention relates to a microphone assembly, such as a table microphone assembly, comprising at least three microphones for providing an output audio signal with directivity.

A remote microphone assembly may be used to pick up the voices of people in the vicinity of the microphone assembly and transmit the resulting signal wirelessly to a hearing device worn by a hearing impaired person, resulting in an improved intelligibility of the voices. To optimize speech intelligibility, the remote microphone assembly may include an array of multiple microphones, so as to implement beamforming and/or spatial noise cancelling to orient the sound pickup in the direction of the active talker, thus maximizing the signal-to-noise ratio (SNR).

In the case of a planar microphone array arrangement with three microphones, the beamformer orientation is limited by design to the plane of the microphone array. For example, a table microphone assembly featuring a triangular microphone array in the horizontal plane can be used to create a beamformer in any direction of the horizontal plane around the device, maximizing the SNR by attenuating the interferent sources having a high incident angle. This is very convenient to cover use cases where people are sitting around a table, i.e., where the incident angles of the talkers relative to the device are low (typically less than 40°).

In some cases, however, the target talkers may appear at a high elevation angle. Typical examples of this are stand-up meetings with the remote microphone placed on a table nearby or on a shelf, a waiter taking an order from a group of people sitting at a table, or a group of people sitting with the remote microphone placed on a low table. In such situations, the classical beamformer strategy may fail as the target sources with high incident angles are attenuated by the beamformer and/or spatial noise cancelling features, resulting in a poor SNR.

US 2021/0243522 A1 relates to a microphone array system mountable on a ceiling of a conference room, wherein a direction recognition unit is used to estimate the location of the talker and steer the beamformer in the direction towards the estimated location of the talker.

US 2021/0051397 A1 relates to a microphone array system which deploys a plurality of lobes from the microphone array, comprising an audio activity localizer and a lobe auto-focuser which updates the location of the lobe to new sound activity, thereby implementing a multiple beam steering both in azimuth and elevation, wherein one beam is updated at a time according to the estimated sound source direction.

US 2013/0039504 A1 relates a method of echo cancellation for conferencing applications, including a beamforming operation. The direction of arrival is determined for orienting or choosing the correct beam from the beamformer unit. The elevation is mentioned as a programmable parameter of the beamformer, which may depend on the positioning of the microphone device, such as at a ceiling, table or wall.

U.S. Pat. No. 10,735,870 B2 relates to a table microphone assembly with three omnidirectional microphones forming an equilateral rectangular triangle, wherein a plurality of fixed beams are formed and one of the beams is selected based on the present values of one or more acoustic parameters of the beam.

It is an object of the invention to provide for a microphone assembly with a planar arrangement of at least three microphones, which provides for an output audio signal with directivity and which is user-friendly while allowing audio sources having relatively large angles of elevation. It is a further object to provide for a corresponding method of providing an audio output signal with directivity.

According to the invention, these objects are achieved by a microphone assembly and a method.

The invention is beneficial in that, by estimating an angle of elevation of an audio source from the input audio signals captured by the microphone assembly and by using the estimated angle of elevation to control a directivity parameter of the audio signal processing unit, the microphone assembly is able to automatically adapt and optimize the directivity of the output audio signal to the angle of elevation of the target audio source. In particular, for low elevation angles maximal directivity may be applied to maximize denoising, whereas for high elevation angles directivity may be reduced in favor of avoiding attenuation of the target audio signal by the directivity feature. Thereby, without a need user interaction, noise reduction resulting from directivity can be fully preserved for low elevation angles while attenuation of the target audio which may result from directivity at high elevation angles can be avoided.

Preferred embodiments of the invention are defined in the dependent claims.

According to one example, the control unit may be configured to control the directivity parameter such that the directivity of the output audio signal is reduced during times when the estimated angle of elevation is found to be above a threshold. In particular, the control unit may be configured to switch the audio signal processing unit to an omnidirectional mode during times when the estimated angle of elevation is found to be above a threshold.

According to another example, the audio signal processing unit may include an adaptive beamformer unit using a beamformer adaptation parameter varying between a lower limit and an upper limit, the beamformer adaptation parameter may determine a denoising performance of the beamformer unit and an attenuation of the audio source by the beamformer unit, and the control unit may be configured to adapt the lower limit and the upper limit of the beamformer adaptation parameter based on the estimated angle of elevation. In particular, the control unit may be configured to define a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value, in the low elevation range the lower limit and the upper limit of the beamformer adaptation parameter may be kept substantially constant at values allowing optimal denoising performance of the beamformer unit, in the high elevation range the lower limit and the upper limit of the beamformer adaptation parameter may be kept substantially constant at values allowing minimizing of the attenuation of the audio source signal by the beamformer unit, and in the transition range the lower limit and the upper limit of the beamformer adaptation parameter may monotonically change from the value of the low elevation range to the values of the high elevation range as a function of the estimated angle of elevation. The values of the lower limit and the higher limit may be higher or equal in the low elevation range than in the high elevation range.

According to still another example, the audio signal processing unit may include a postfilter unit using a postfilter adaptation parameter which determines the activity of the postfilter unit; the activity of the postfilter unit may determine a denoising performance of the postfilter unit and an attenuation of the audio source; and the control unit may be configured to change a weight of the postfilter adaptation parameter based on the estimated angle of elevation. In particular, the control unit may be configured to define a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value; in the low elevation range the postfilter adaptation parameter weight may be kept substantially constant at values allowing optimal denoising performance of the postfilter unit; in the high elevation range the postfilter adaptation parameter weight may be kept substantially constant at values allowing minimizing of the attenuation of the audio source signal by the postfilter unit; and in the transition range the postfilter adaptation parameter weight may monotonically change from the value of the low elevation range to the value of the high elevation range as a function of the estimated angle of elevation. In the low elevation range the postfilter adaptation parameter weight may be maximal and in the high elevation range the postfilter adaptation parameter weight may be minimal.

According to one example, the microphones may define an isosceles triangle, wherein the first pair of microphones forms one of the two equal sides of the triangle and wherein the second pair of microphones forms the other one of the two equal sides of the triangle.

According to another example, the microphones may define an equilateral triangle.

According to one example, the audio source direction estimation unit may include a third direction of arrival estimation module for estimating a third angle of incidence between the audio source and a third axis defined by a third pair of the microphones with regard to a base point centered between the microphones of the third pair of microphones, and the elevation estimation module may be configured to estimate the angle of elevation of the audio source based on the estimated first angle of incidence, the estimated second angle of incidence and the estimated third angle of incidence.

In particular, the elevation estimation module may comprise a first submodule, a second submodule and a third submodule, each of the submodules configured to provide for a pre-estimate of the angle of elevation of the audio source based on a different pair of the estimated first angle of incidence, the estimated second angle of incidence and the estimated third angle of incidence, and an elevation fusion submodule configured to generate the estimate of the angle of elevation of the audio source from the pre-estimates of the angle of elevation of the audio source. The elevation fusion submodule may be configured to exploit redundancy of the sub-estimates to increase robustness of the estimate of the angle of elevation of the audio source.

According to one example, each direction of arrival estimation module may be configured to provide its estimated angle of incidence between the audio source and its axis as an uncertainty cone around its axis, and the elevation estimation module or submodule, respectively, may be configured to provide the estimate or pre-estimate of the angle of elevation, respectively, from an intersection line of the uncertainty cones of the estimated first angle of incidence and the estimated second angle or of the respective pair of the estimated first angle of incidence, the estimated second angle of incidence and the estimated third angle of incidence, respectively.

According to one example, the microphone assembly may be configured to update the estimated angle of elevation used by the control unit for controlling said directivity parameter of the audio signal processing unit only during times when voice activity is detected. In particular, the microphone assembly may comprise a voice activity detector for determining voice activity from the input audio signals. Alternatively, the microphone assembly may be configured to divide the microphone plane into angular regions and to determine voice activity and an estimated angle of elevation for each angular region, so as to store the estimated angle of elevation for each angular region and to update the respective estimated angle of elevation only during times when voice activity is detected in the respective angular region. Further, the control unit may be configured to use the most recently updated estimated angle of elevation.

According to one example, the microphone assembly may be a table microphone assembly, wherein the microphone plane is parallel to the table plane when the table microphone assembly is placed on a table.

According to one example, the microphone assembly may form part of a hearing assistance system which comprises a wireless interface for transmitting the output audio signal as an audio stream and a hearing device comprising a wireless interface for receiving the audio stream from the microphone assembly and an output transducer for stimulating a user's hearing according to the audio stream.

Hereinafter, examples of the invention will be illustrated by reference to the attached drawings, wherein.

A "hearing device" as used hereinafter is any ear level element suitable for reproducing sound by stimulating a user's hearing, such as an electroacoustic hearing aid, a bone conduction hearing aid, an active hearing protection device, a hearing prostheses element such as a cochlear implant, a wireless headset, an earbud, an earplug, an earphone, etc.

Figure 1:
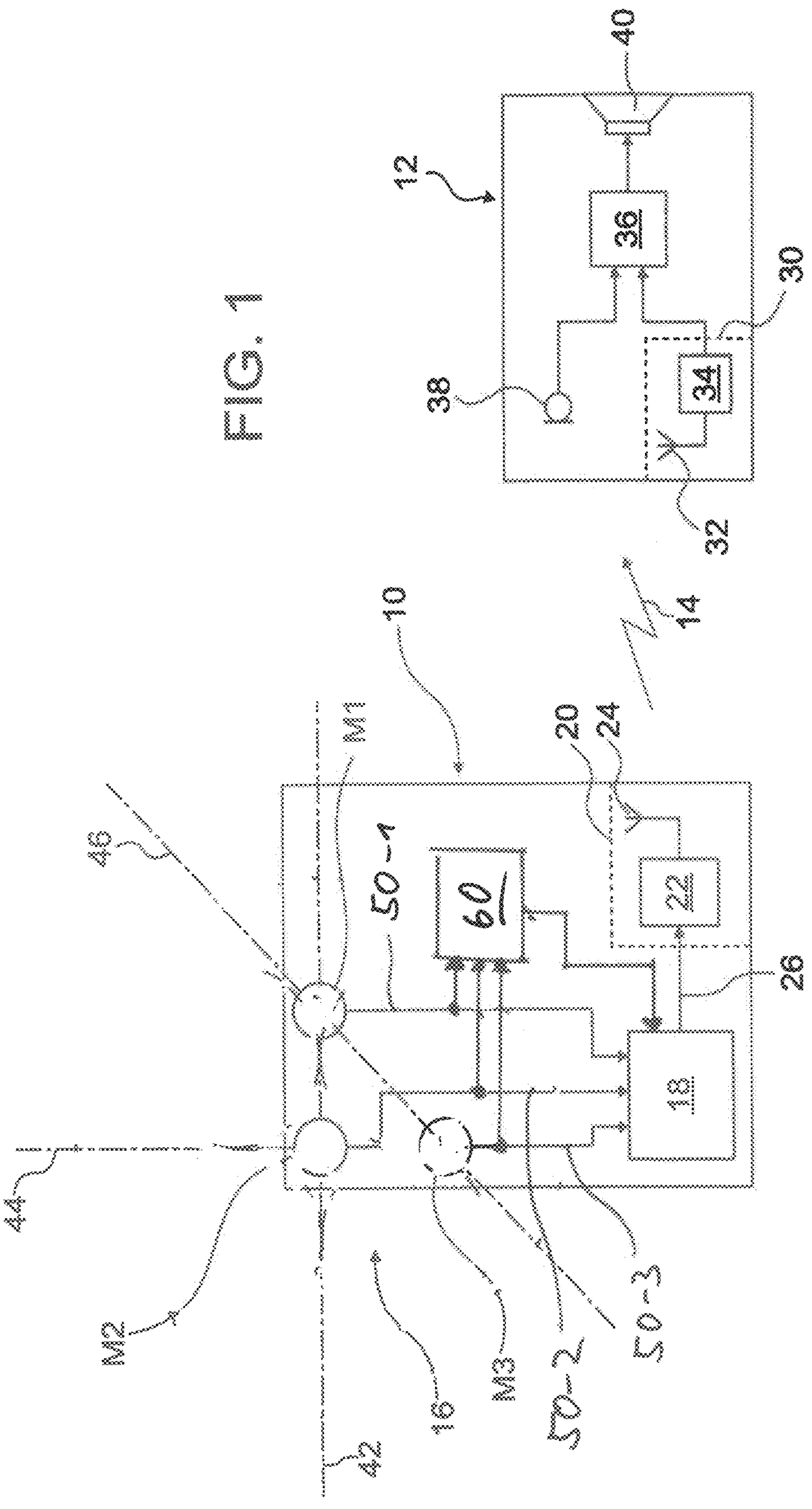
FIG. 1 is a schematic illustration of an example of a hearing assistance system of the invention.

FIG. 1 is a schematic representation of an example of a hearing assistance system according to the invention, comprising a table microphone assembly 10 for capturing audio signals from a plurality of persons sitting around a table and at least one hearing device 12 which is worn by a listener and which receives audio signals from the table microphone assembly 10 via a wireless audio link 14. A typical use situation of such system is that the table microphone assembly 10 is placed on a table with a plurality of talking persons being distributed around the table, wherein a listener wearing a hearing device 12 likewise is located at the table.

The table microphone assembly 10 comprises a microphone arrangement 16 for capturing input audio signals from an audio source located close to the table microphone assembly 10 (usually the voice of one of the persons at the table), an audio signal processing unit 18 for processing the captured audio signals and a transmission unit 20 comprising a transmitter 22 and an antenna 24 for transmitting an output audio signal 26 provided by the audio signal processing unit 18 as an audio stream via the wireless link 14 to the hearing device 12. The table microphone assembly 10 further comprises a directivity control unit 60 for estimation an angle of elevation of a sound source, e.g., a talking person, and controlling a directivity of the output audio signal 26 according to the estimated angle of elevation.

The hearing device 12 comprises a receiver unit 30 including an antenna 32 and a receiver 34 for receiving the audio signals transmitted via the wireless link 14 and for supplying a corresponding audio stream to an audio signal processing unit 36 which typically also receives an audio input from a microphone arrangement 38. The audio signal processing unit 36 generates an audio output which is supplied to an output transducer 40 for stimulating the user's hearing, such as a loudspeaker. According to one example, the hearing device 12 may be a hearing instrument, such as a hearing aid, or an auditory prosthesis, such as a cochlear implant. According to another example, the hearing device 12 may be a wireless earbud or a wireless headset. Typically, the hearing assistance system comprises a plurality of hearing devices 12 which may be grouped in pairs so as to implement binaural arrangements for one or more listeners, wherein each listener wears two of the devices 12.

The wireless link 14 may be a digital link which, for example, uses carrier frequencies in the 2.4 MHz ISM band. The wireless link 14 may use a standard protocol, such as a Bluetooth protocol, in particular a Bluetooth Low Energy protocol, such as Bluetooth Low Energy Audio, or it may use a proprietary protocol.

Figure 4:
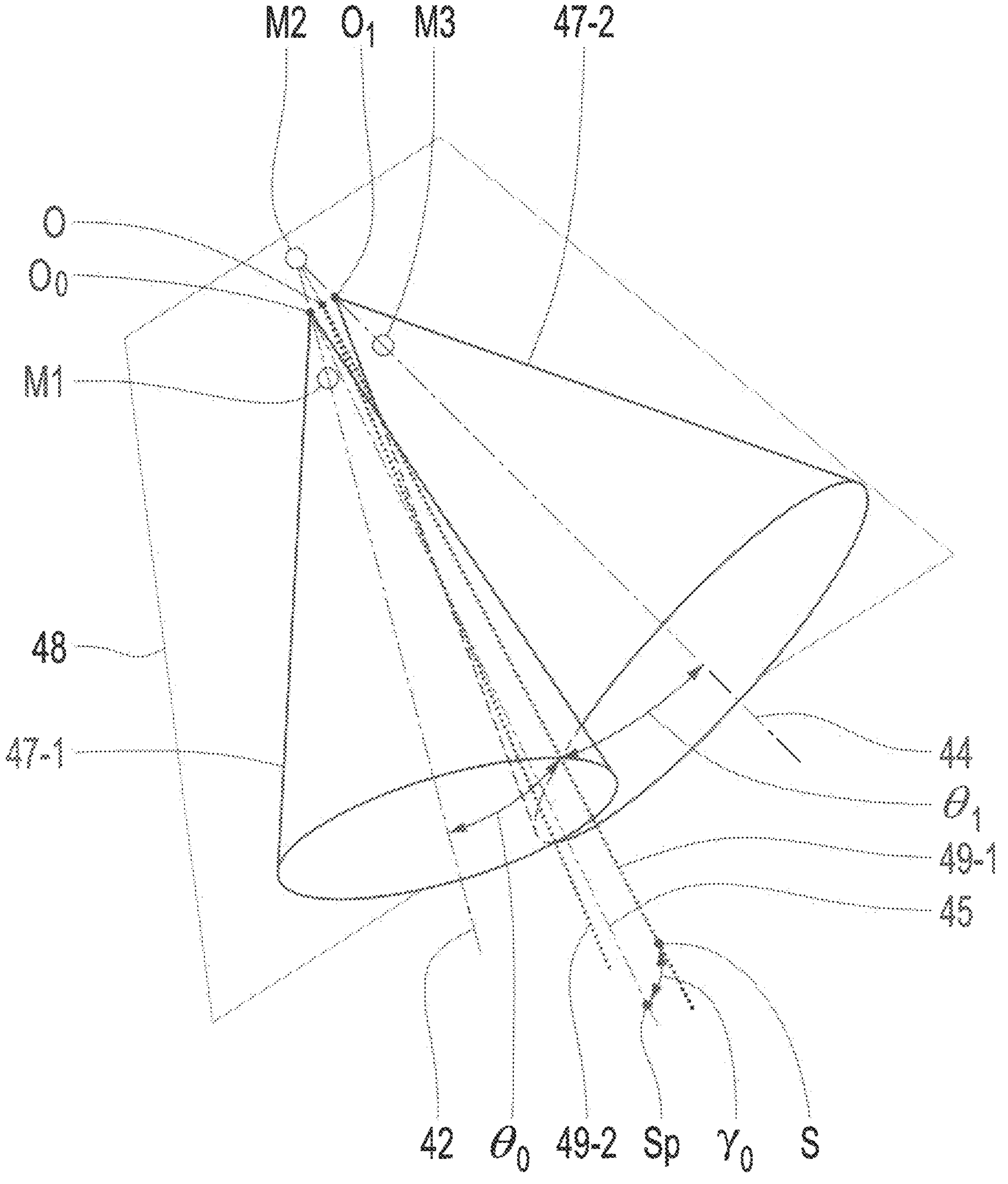
FIG. 4 is an illustration of how the angle of elevation can be estimated from the direction of arrival determined by two different pairs of microphones.

The microphone arrangement 16 of the table microphone assembly 10 comprises at least three microphones M1, M2 and M3 which are arranged in a non-linear manner (i.e., which are not arranged on a straight line) in order to enable the formation of at least two different pairs of microphones defining axes which are angled with regard to each other, thereby defining a microphone plane (indicated at 48 in FIG. 4; the microphone plane would be parallel to the table when the table microphone assembly 10 is placed on a table). In the example of FIG. 1, the microphone arrangement comprises three microphones which are arranged in an essentially L-shaped configuration defining an isosceles triangle, wherein the axis 42 defined by the microphones M1 and M2 is essentially perpendicular to the axis 44 defined by the microphones M2 and M3 and wherein the distance between M1 and M2 equals the distance between M3 and M2.

The input audio signal 50-1, 50-2, 50-3 captured by each of the microphones M1, M2 and M3 is supplied both to the audio signal processing unit 18 and to the directivity control unit 60. The directivity control unit 60 controls at least one directivity parameter of the audio signal processing unit 18 on which a directivity of the output audio signal depends according to the estimated angle of elevation of the target audio source (e.g., a talking person).

Figure 2:
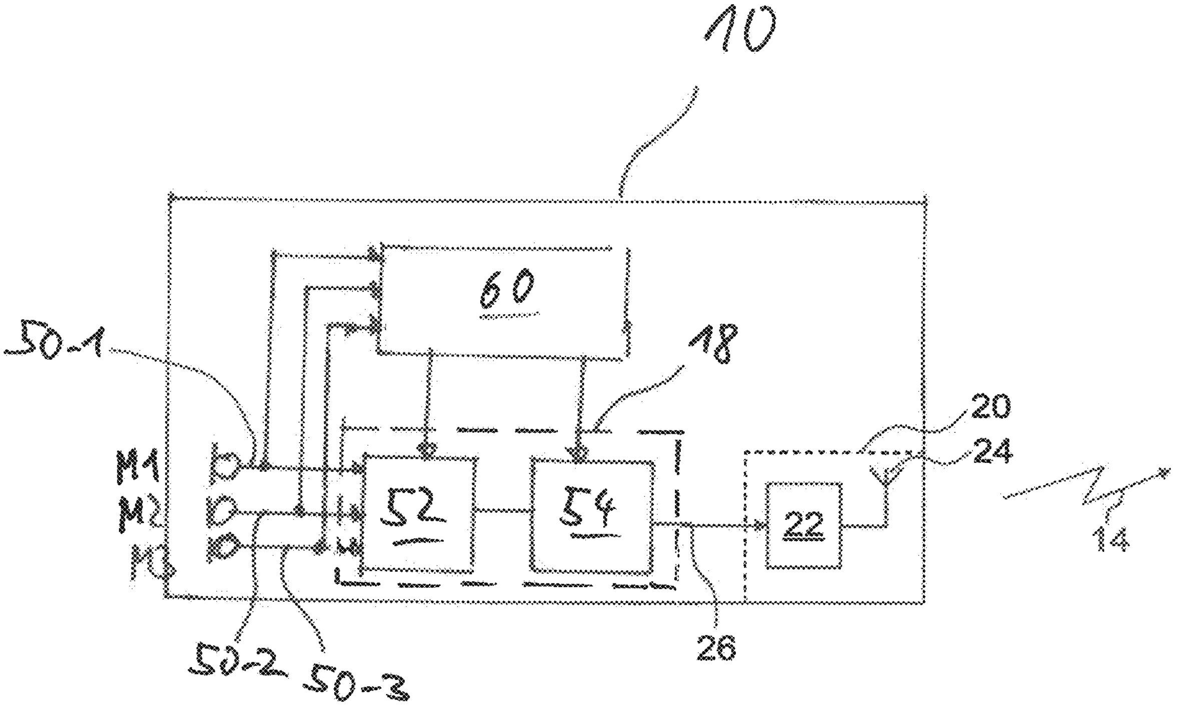
FIG. 2 is a schematic illustration of the audio signal processing in the microphone assembly of the hearing assistance system of FIG. 1.

The audio signal processing in the table microphone assembly 10 is schematically illustrated in FIG. 2, wherein the audio signal processing unit 18 comprises an adaptive beamformer unit 52 and a postfilter unit 54. The input audio signal 50-1, 50-2, 50-3 captured by each of the microphones M1, M2 and M3 is supplied both to the adaptive beamformer unit 52 and to the directivity control unit 60. The processed signal provided by the beamformer unit 52 is further processed in the postfilter unit 54 so as to provide the output audio signal 26. In the example of FIG. 2, the directivity control unit 60 acts both on the adaptive beamformer unit 52 and the postfilter unit 54 so as to control the directivity imparted to the audio signals by these units 52, 54.

Figure 3:
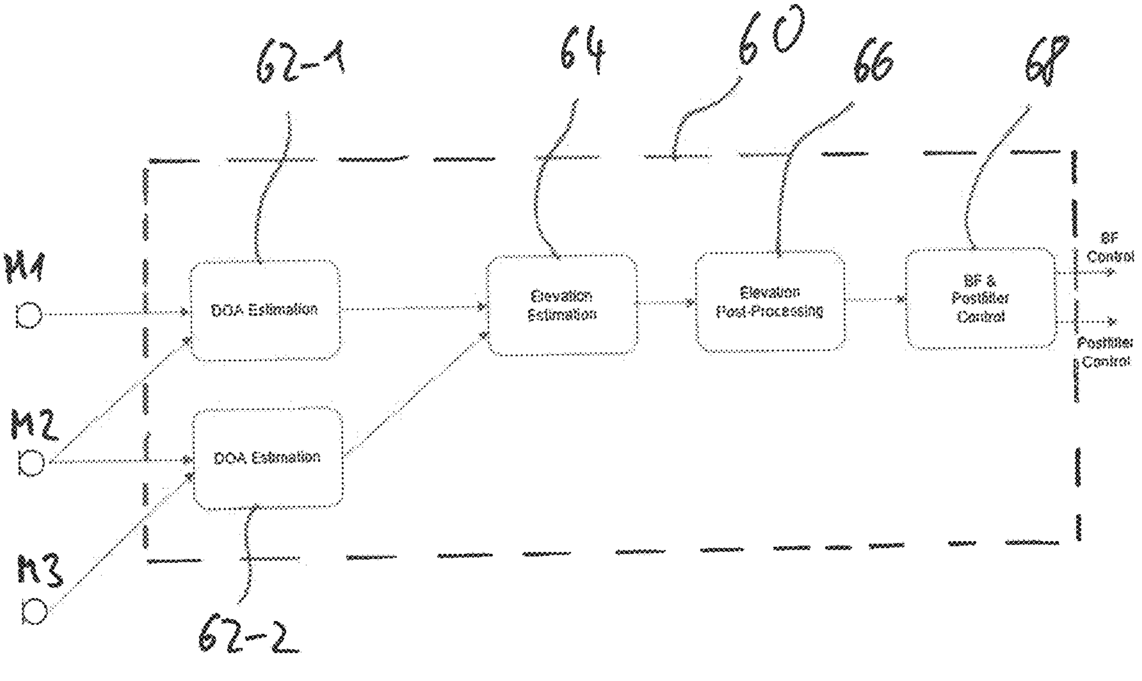
FIG. 3 is a block diagram of an example of the control of the audio signal processing of the microphone assembly of FIG. 2 according to the angle of elevation of the target audio source.

FIG. 3 illustrates in a block diagram a first example of how the audio signal processing in the audio signal processing unit 18 may be controlled according to the angle of elevation of the target audio source. In the example of FIG. 3, the microphones M1, M2 and M3 are grouped to form two different pairs, namely a first pair formed by the microphones M1 and M2 and a second pair formed by the microphones M2 and M3, wherein the first pair formed by the microphones M1 and M2 is associated with a first direction of arrival estimation module 62-1 for estimating a first angle of incidence $\Theta_0$ between the audio source and the axis 42 defined by the microphones M1 and M2 and wherein the second pair formed by the microphones M2 and M3 is associated with a second direction of arrival estimation module 62-2 for estimating a second angle of incidence $\Theta_1$ between the audio source and the axis 44 defined by the microphones M2 and M3. It is noted that the angle of incidence is defined with regard to a (base) point centered between the microphones of the respective pair of microphones.

The output of the direction of arrival estimation modules 62-1 and 62-2 is supplied to an elevation estimation module 64 which estimates an angle of elevation $\gamma$0 of the audio source with regard to the microphone plane 48 based on the estimated first angle of incidence Do and the estimated second angle of incidence $\Theta_1$.

FIG. 4 illustrates how the angle of elevation $\gamma$0 of an audio source S can be estimated from the two angles of incidence $\Theta_0$, $\Theta_1$ which are defined with regard to a base point $O_0$, $O_1$ centered between the two microphones of the respective pair of microphones, M1/M2 and M2/M3, respectively. The angle of elevation is defined as the angle $\gamma_0$ between a line connecting a base point O with the audio source S and a line 45 in the microphone plane 48 connecting the base point O with a projection point $S_p$ of the audio source S onto the microphone plane 48, wherein the base point O is an average of the two base points $O_0$, $O_1$. Each direction of arrival estimation module 62-1, 62-2 provides its estimated angle of incidence as an uncertainty cone 47-1, 47-2 around its dedicated microphone axis 42, 44, having its tip the respective base point $O_0$, $O_1$.

The elevation estimation module 64 determines the estimate of the angle of elevation $\gamma_0$ from the upper one of the two intersection lines 49-1, 49-2 of the uncertainty cones of the estimated first angle of incidence $\Theta_1$ and the estimated second angle of incidence $\Theta_2$. It is noted that the elevation estimation module is not able to discriminate a positive from a negative elevation of the same magnitude; however, the target audio source is expected to be elevated above the microphone plane 48, i.e., above the table on which the microphone assembly 10 is placed, so that the upper intersection line/point 49-1 has to be selected. It is also noted that the above approach is based on the assumption that the distance between the two base points $O_0$, $O_1$ is small compared to the distances between the each of the base points $O_0$, $O_1$ and the audio source S, which condition in practice usually will be fulfilled; i.e., the approach uses a farfield assumption.

It is noted that in the particular case where the two microphone axes 42, 44 form an angle of 60° the elevation angle $\gamma_0$ can be derived as follows:

$$\phi_0 = \arccos\left(\max\left(-1, \min\left(1, \frac{\cos(\theta_0) + 2\cos(\theta_1)}{\sqrt{3}\sin(\theta_0)}\right)\right)\right)$$

$$\gamma_0 = \frac{\pi}{2} - \arccos(\max(-1, \min(1, \sin(\phi_0)\sin(\theta_0))))$$

wherein $\Theta_0$ and $\Theta_1$ are the angles of incidence.

It is noted that the above approach can be analogously extended to more than the two pairs of microphones (for example, the microphones M1 and M3 may form a third pair of microphones for which a third angle of incidence is determined with regard to a base point centered between microphones M1, M3, which third base point then also would be considered when determining the base point O as the average of the base points of the microphone pairs).

The elevation angle estimate produced by the elevation estimation module 64 might undergo post-processing, using metadata from other sub-systems, to become more reliable and robust. In the example of FIG. 3 such post-processing is carried out by an elevation post-processing module 66 which outputs the final estimate γ of the angle of elevation which is then used by a control unit 68 for controlling a directivity parameter of the audio signal processing unit 18.

For example, the direction of arrival estimate tends to lose its pertinence when speech energy (i.e., the energy of the talker's voice) is too low. Although the direction of arrival estimation modules 62-1, 62-2 should already take this aspect into account, it might be desirable to post-process the estimated elevation angle using speech presence information.

To address this issue, one may use of information provided by a Voice Activity Detector (VAD) to post-process the elevation estimate improves its stability, reliability and robustness. For example, the final elevation estimate γ may be updated using the elevation estimate $\gamma_0$ from the elevation estimation module 64 only when a VAD signal provided by a VAD module (not shown in FIG. 3) is set. In other words, the estimated angle of elevation used by the control unit for controlling a directivity parameter of the audio signal processing unit 18 is updated only during times when voice activity is detected.

Another potential issue is due to the fact that the direction of incidence estimation modules 62-1, 62-2 can only consider a single audio source (single talker) by design (i.e., this is a model assumption). Consequently, a situation with multiple talkers, potentially with different elevation incidence angles, will be considered by the entity formed by direction of incidence estimation modules 62-1, 62-2 and the elevation estimation module 64 as a unique source moving quickly both in the horizontal plane and in elevation. To address this situation, the tracking ability of each direction of incidence estimation module 62-1, 62-2 would have to be increased, very likely at the cost of stability.

To avoid such stability problem a different option may be considered, wherein information about talker activity is detected in different angular regions (i.e., sectors) of the microphone plane 48 and is associated to one of the multiple audio sources. Based on this information, the elevation post-processing module 66 can store an elevation estimate per angular region (sector) and update the elevation estimate only when the angular region is marked as being active. Such a strategy may improve stability, reliability and robustness. Thus, the final elevation estimate γ is updated by the elevation post-processing module 66 using the estimate $\gamma_0$ from the elevation estimation module 64 based on information about talker activity per angular region of the microphone plane 48, wherein the estimated angle of elevation of a certain angular region is updated only during times when voice activity is detected in that angular region. An example for detecting voice activity per angular region with a non-linear arrangement of three microphones is described, for example, in U.S. Pat. No. 10,735,870 B2.

The estimation of the elevation angle also could be improved by exploiting an arrangement of the three microphones M1, M2, M3 with maximal symmetry, in which the microphones M1, M2, M3 form an equilateral triangle (in the example illustrated in FIG. 1 the microphones M1, M2 and M3 form an isosceles triangle). Such arrangement defines three homogenous two-microphone uniform linear arrays, namely the pair M1 and M2, the pair M2 and M3 and the pair M1 and M3 (in the example illustrated in FIG. 1 there are only two homogenous two-microphone uniform linear arrays, namely the pair M1 and M2 and the pair M2 and M3).

Figure 5:
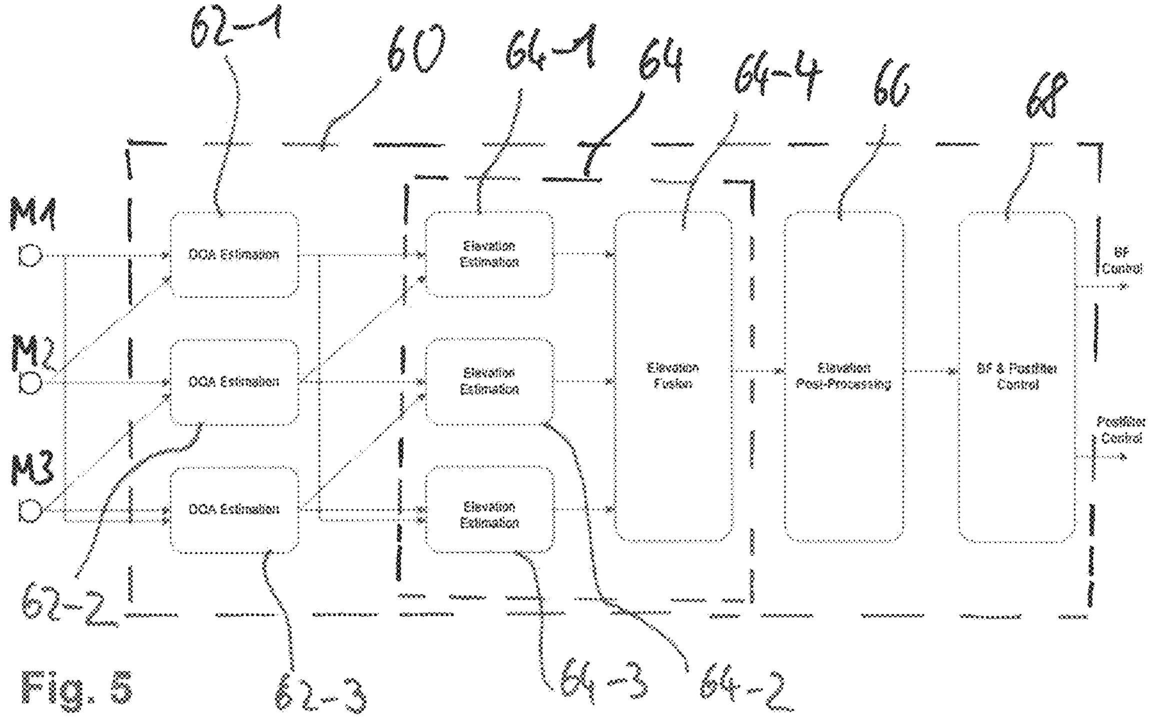
FIG. 5 is a block diagram of an alternative example of the control of the audio signal processing of the microphone assembly of FIG. 2 according to the angle of elevation of the target audio source.

An example of an elevation estimation for such maximally symmetric microphone arrangement is schematically shown in FIG. 5, wherein a dedicated direction of arrival estimation module is provided for each of the three pairs of microphones, so that in addition to the first direction of arrival estimation module 62-1 for the first pair M1 and M2 and the second the direction of arrival estimation module 62-2 for the second pair M2 and M3 a third direction of arrival estimation module 62-3 is provided for the third pair M1 and M3.

Thus, a dedicated elevation estimation submodule is provided for each pair of the direction of arrival estimation module, namely a first elevation estimation submodule 64-1 for the pair formed by the first direction of arrival estimation module 62-1 and the second direction of arrival estimation module 62-2, a second elevation estimation submodule 64-2 for the pair formed by the second direction of arrival estimation module 62-2 and the third direction of arrival estimation module 62-3 and a third elevation estimation submodule 64-3 for the pair formed by the first direction of arrival estimation module 62-1 and the third direction of arrival estimation module 62-3.

Each of the elevation estimation submodules 64-1, 64-2, 64-3 works in the way it was described for the elevation estimation module of FIG. 3, i.e., it provides for a (pre-) estimate of the elevation angle $\gamma_0$ based on the intersection lines of the two uncertainty cones of the direction of arrival angle estimate provided by the associated pair of arrival estimation modules. Thereby three (potentially slightly different) pre-estimates of the elevation angle are obtained which are supplied to an elevation fusion submodule 64-4 which generates a consolidated estimate of the angle of elevation $\gamma_0$ from the three sub-estimates. The consolidated estimate of the angle of elevation $\gamma_0$ provided by the elevation fusion submodule 64-4 corresponds to the estimate of the angle of elevation $\gamma_0$ provided by the elevation estimation module 64 of the example of FIG. 3 and is supplied to the post-processing module 66.

In the example of FIG. 5 the utilization of the third pair of microphones allows to exploit redundancy of the sub-estimates of the elevation angle to increase robustness of the estimate of the angle of elevation. However, the example of FIG. 3 requires lower computational complexity, since only two direction of arrival estimation modules are required instead of three as in the example of FIG. 5 and since only one elevation estimation module is required instead of the three elevation estimation submodules and the elevation fusion submodule.

Another aspect is the symmetry or homogeneity of the microphone arrangement. While a fully symmetric arrangement like an equilateral triangle, or a highly symmetric arrangement like a an isosceles triangle, simplifies computation for estimation of the elevation angle and may make the system numerically more robust, the microphone arrangement of the example FIG. 3 could be even further simplified by removing the constraints of homogeneity on the uniform linear array microphones, i.e., the three microphones actually could form any triangle.

The control unit 68 typically controls at least one directivity parameter used in the audio signal processing unit such that the directivity of the output audio signal 26 is reduced during times when the estimated angle of elevation is found to be above a threshold, so as to avoid attenuation of the audio signal from the target audio source resulting from directivity at high elevation angles.

For example, the control unit 68 may switch the signal processing unit 18 to an omnidirectional mode during times when the estimated angle of elevation is found to be above a threshold.

Figure 6A:
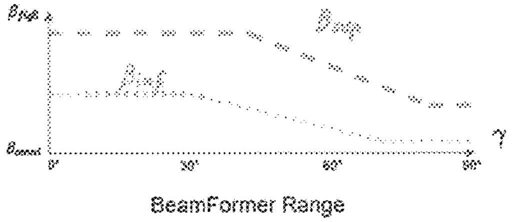
FIG. 6A is an illustration of an example of how a lower limit and an upper limit of a beamformer adaptation parameter used by a beamformer of the microphone assembly may vary as a function of the angle of elevation of the target audio source.

According to other examples, directivity may be controlled in a more sophisticated manner, as illustrated in FIGS. 6A,B and 7A,B.

The control module is used to directly constrain the internal variables $\beta$ and $A_{pf}$ of the beamformer and postfilter algorithms respectively.

The postfilter can be viewed as black-box applying an attenuation gain on the signal. The attenuation gain is called here activity for more generality and labelled $A_{pf}$. The control module defines an adaptive scaling factor $w_{Apf}$ for $A_{pf}$, based on an external criterium. In this particular case, this criteria is the elevation.

The adaptive beamformer unit 52 may use a beamformer adaptation parameter $\beta$ varying between a lower limit $\beta_{inf}$ and an upper limit $\beta_{sup}$, wherein the beamformer adaptation parameter determines a denoising performance of the beamformer and an attenuation of the audio source by the beamformer. For example, the beamformer adaptation parameter $\beta$ may define the directionality of the pattern of the adaptive beam Y by weighting the mixture of static beam patterns Cr (front cardioid) and $C_b$ (back cardioids) according to $Y=C_r-\beta*C_b$. For instance, $\beta=0$ provides a front cardioid pattern for Y, while $\beta=1$ provides a dipole pattern for Y. The control unit 68 defines an adaptive range with the lower and upper limits $\beta_{inf}$ and limit $\beta_{sup}$ for $\beta$, based on an external criterium, such as the elevation.

In other words, the control unit 68 may adapt the lower limit and the upper limit of the beamformer adaptation parameter based on the estimated angle of elevation. An example of such adaptation is shown FIG. 6A, wherein the lower limit and an upper limit of the beamformer adaptation parameter are shown as a function of the estimated angle of elevation.

In the example of FIG. 6A, the control unit 68 defines a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value.

In the low elevation range the lower limit and the upper limit of the beamformer adaptation parameter are kept substantially constant at values allowing optimal denoising performance of the beamformer (at low elevation angles the directivity of the beamformer does not attenuate the target audio source).

In the high elevation range the lower limit and the upper limit of the beamformer adaptation parameter are kept substantially constant at values allowing minimizing of the attenuation of the audio source signal by the beamformer.

In the transition range the lower limit and the upper limit of the beamformer adaptation parameter monotonically (e.g., linearly) change from the value of the low elevation range to the values of the high elevation range as a function of the estimated angle of elevation.

Both the values of the lower limit and the higher limit of the beamformer adaptation parameter are higher or equal in the low elevation range than in the high elevation range.

It is noted that the threshold values defining the low elevation range, the high elevation range and the transition range may be different for the lower limit and the upper limit of the beamformer adaptation parameter, as shown in the example of FIG. 6A.

Figure 6B:
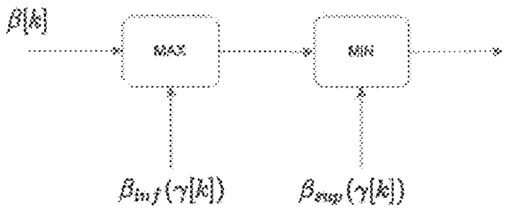
FIG. 6B is a schematic illustration of how the lower limit and an upper limit are applied to the beamformer adaptation parameter.

FIG. 6B is a schematic illustration of how the lower limit $\beta_{int}$ and an upper limit $\beta_{sup}$ are applied to the beamformer adaptation parameter $\beta$.

The postfilter unit 54 uses a postfilter adaptation parameter, namely an activity $A_{pf}$, which determines the activity of the postfilter unit 54. The activity of the postfilter unit 54 determines a denoising performance on the output audio signal 26 and, depending on the elevation angle of the target audio source, may result in an attenuation of the audio signal from the target audio source, so that attenuation of the audio signal from the target audio source can be avoided by appropriate control of the activity of the postfilter unit 54 according to the elevation angle of the target audio source. In other words, the activity $A_{pf}$ may be considered as an attenuation gain applied to the audio signal.

Figure 7A:
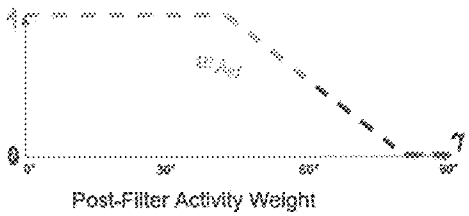
FIG. 7A is an illustration of an example of how a weight of a postfilter adaptation parameter used by a postfilter unit of the microphone assembly may vary as a function of the angle of elevation of the target audio source.

An example of how an adaptive scaling factor, i.e., a weight, $w_{Apf}$, applied to the postfilter adaptation parameter, i.e., to the activity $A_{pf}$, used by the postfilter unit 54 may vary as a function of the estimated angle of elevation is illustrated in FIG. 7A.

Similar to example of FIG. 6A, the control unit 68 may define a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value.

In the low elevation range the postfilter adaptation parameter weight is kept substantially constant at values allowing optimal denoising performance of the postfilter unit.

In the high elevation range the postfilter adaptation parameter weight is kept substantially constant at values allowing minimizing of the attenuation of the audio source signal by the postfilter unit.

In the transition range the postfilter adaptation parameter weight monotonically (e.g., linearly) changes from the value of the low elevation range to the value of the high elevation range as a function of the estimated angle of elevation.

In the low elevation range the postfilter adaptation parameter weight is maximal and in the high elevation range the postfilter adaptation parameter weight is minimal.

It is noted that that the threshold values defining the low elevation range, the high elevation range and the transition range for the postfilter adaptation parameter weight, i.e. for postfilter activity weight, may—und typically will—be different form the respective threshold values defining the low elevation range, the high elevation range and the transition range for the lower limit and the upper limit of the beamformer adaptation parameter.

Figure 7B:
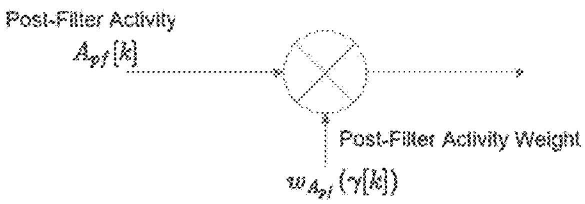
FIG. 7B is a schematic illustration of how the weight is applied to the postfilter adaptation parameter.

FIG. 7B is a schematic illustration of how the weight $w_{Apf}$ is applied to the activity $A_{pf}$.

In summary, the present invention proposes a microphone assembly with a planar microphone arrangement comprising at least three microphones defining a microphone plane. The microphone assembly allows unattenuated sound pickup from a target audio source (e.g. a talking person) independently of the elevation of the target audio source while introducing only minimal denoising performance loss. To this end, the microphone assembly tracks the elevation of the target audio source and automatically applies the corresponding control to at least one directivity parameter of the processed audio signal, so as to apply, for example, the respectively required minimal beamforming and post-filtering mitigations.

The invention claimed is:

1. A microphone assembly comprising:

at least three spaced apart microphones defining a microphone plane, each configured to capture an input audio signal from an audio source;

an audio signal processing unit for processing the input audio signals in a manner so as to generate an output audio signal with a directivity;

an audio source direction estimation unit including:

a first direction of arrival estimation module for estimating a first angle of incidence between the audio source and a first axis defined by a first pair of the microphones with regard to a base point centered between the microphones of the first pair of microphones;

a second direction of arrival estimation module for estimating a second angle of incidence between the audio source and a second axis defined by a second pair of the microphones with regard to a base point centered between the microphones of the second pair of microphones, the second pair of microphones being different from the first pair of microphones and the first axis and the second axis having different directions; and an elevation estimation module for estimating an angle of elevation of the audio source with regard to the microphone plane based on the estimated first angle of incidence and the estimated second angle of incidence; and a control unit for using the estimated angle of elevation to control a directivity parameter of the audio signal processing unit on which the directivity of the output audio signal depends, wherein the control unit is configured to control said directivity parameter such that the directivity of the output audio signal is reduced during times when the estimated angle of elevation is found to be above a threshold, wherein the audio signal processing unit includes an adaptive beamformer unit using a beamformer adaptation parameter varying between a lower limit and an upper limit, wherein the beamformer adaptation parameter determines a denoising performance of the beamformer unit and an attenuation of the audio source by the beamformer unit, and wherein the control unit is configured to adapt the lower limit and the upper limit of the beamformer adaptation parameter based on the estimated angle of elevation.

2. The microphone assembly of claim 1, wherein the control unit in configured to switch the audio signal processing unit to an omnidirectional mode during times when the estimated angle of elevation is found to be above a threshold.

3. The microphone assembly of claim 1, wherein:

the control unit is configured to define a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value;

in the low elevation range the lower limit and the upper limit of the beamformer adaptation parameter are kept substantially constant at values allowing optimal denoising performance of the beamformer unit;

in the high elevation range the lower limit and the upper limit of the beamformer adaptation parameter are kept substantially constant at values allowing minimizing of the attenuation of the audio source signal by the beamformer unit; and in the transition range the lower limit and the upper limit of the beamformer adaptation parameter monotonically change from the value of the low elevation range to the values of the high elevation range as a function of the estimated angle of elevation.

4. The microphone assembly of claim 3, wherein the values of the lower limit and the higher limit are higher or equal in the low elevation range than in the high elevation range.

5. The microphone assembly of claim 1, wherein:

the audio signal processing unit includes a postfilter unit using a postfilter adaptation parameter which determines the activity of the postfilter unit;

the activity of the postfilter unit determines a denoising performance of the postfilter unit and an attenuation of the audio source; and the control unit is configured to change a weight of the postfilter adaptation parameter based on the estimated angle of elevation.

6. The microphone assembly of claim 5, wherein:

the control unit is configured to define a low elevation range in which the estimated angle of elevation is below a first threshold value, a high elevation range in which the estimated angle of elevation is above a second threshold value higher than the first threshold value and a transition range in which the estimated angle of elevation is between the first threshold value and the second threshold value;

in the low elevation range the postfilter adaptation parameter weight is kept substantially constant at values allowing optimal denoising performance of the postfilter unit;

in the high elevation range the postfilter adaptation parameter weight is kept substantially constant at values allowing minimizing of the attenuation of the audio source signal by the postfilter unit; and in the transition range the postfilter adaptation parameter weight monotonically changes from the value of the low elevation range to the value of the high elevation range as a function of the estimated angle of elevation.

7. The microphone assembly of claim 6, wherein in the low elevation range the postfilter adaptation parameter weight is maximal and in the high elevation range the postfilter adaptation parameter weight is minimal.

8. The microphone assembly of claim 1, wherein:

the audio source direction estimation unit includes a third direction of arrival estimation module for estimating a third angle of incidence between the audio source and a third axis defined by a third pair of the microphones with regard to a base point centered between the microphones of the third pair of microphones; and the elevation estimation module is configured to estimate the angle of elevation of the audio source based on the estimated first angle of incidence, the estimated second angle of incidence and the estimated third angle of incidence.

9. The microphone assembly of claim 8, wherein the elevation estimation module comprises:

a first submodule, a second submodule and a third submodule, each of the submodules configured to provide for a pre-estimate of the angle of elevation of the audio source based on a different pair of the estimated first angle of incidence, the estimated second angle of incidence and the estimated third angle of incidence, and an elevation fusion submodule configured to generate the estimate of the angle of elevation of the audio source from the pre-estimates of the angle of elevation of the audio source.

10. The microphone assembly of claim 1, wherein:

each direction of arrival estimation module is configured to provide its estimated angle of incidence between the audio source and its axis as an uncertainty cone around its axis; and the elevation estimation module or submodule, respectively, is configured to provide the estimate or pre-estimate of the angle of elevation, respectively, from an intersection line of the uncertainty cones of the estimated first angle of incidence and the estimated second angle or of the respective pair of the estimated first angle of incidence, the estimated second angle of incidence and the estimated third angle of incidence, respectively.

11. The microphone assembly of claim 1, wherein the microphone assembly is configured to update the estimated angle of elevation used by the control unit for controlling said directivity parameter of the audio signal processing unit only during times when voice activity is detected.

12. A hearing assistance system comprising:

the microphone assembly of claim 1, further comprising a wireless interface for transmitting the output audio signal as an audio stream; and a hearing device comprising a wireless interface for receiving the audio stream from the microphone assembly and an output transducer for stimulating a user's hearing according to the audio stream.

13. A method of providing an output audio signal from an audio source, comprising:

providing a microphone assembly comprising at least three spaced apart microphones defining a microphone plane;

capturing, by each of the microphones, an input audio signal from the audio source;

estimating a first angle of incidence between the audio source and a first axis defined by a first pair of the microphones with regard to a base point centered between the microphones of the first pair of microphones;

estimating a second angle of incidence between the audio source and a second axis defined by a second pair of the microphones with regard to a base point centered between the microphones of the second pair of microphones, the second pair of microphones being different from the first pair of microphones and the first axis and the second axis having different directions;

estimating an angle of elevation of the audio source with regard to the microphone plane based on the estimated first angle of incidence and the estimated second angle of incidence;

processing, by an audio signal processing unit including an adaptive beamformer unit using a beamformer adaptation parameter varying between a lower limit and an upper limit, the input audio signals in a manner so as to generate an output audio signal with a directivity;

adapting the lower limit and the upper limit of the beamformer adaptation parameter based on the estimated angle of elevation; and controlling a directivity parameter of the signal processing on which the directivity of the output audio signal depends such that the directivity of the output audio signal is reduced during times when the estimated angle of elevation is found to be above a threshold, wherein the beamformer adaptation parameter determines a denoising performance of the beamformer unit and an attenuation of the audio source by the beamformer unit.

* * * * *